United States Patent [19]
Weise et al.

[11] Patent Number: 5,180,211
[45] Date of Patent: Jan. 19, 1993

[54] BRAKE SYSTEM FOR AUTOMOTIVE VEHICLES WITH ELECTRONICALLY CONTROLLED BRAKE FORCE DISTRIBUTION AND WITH ANTI-LOCK CONTROL

[75] Inventors: Lutz Weise, Mainz; Helmut Fennel, Bad Soden; Hans Wupper, Friedrichsdorf/Ts., all of Fed. Rep. of Germany

[73] Assignee: Alfred Teves GmbH, Frankfurt am Main, Fed. Rep. of Germany

[21] Appl. No.: 699,863

[22] Filed: May 14, 1991

[30] Foreign Application Priority Data

May 16, 1990 [DE] Fed. Rep. of Germany ....... 4015747

[51] Int. Cl.$^5$ .............................................. B60T 8/26
[52] U.S. Cl. .............................. 303/9.63; 303/119 R; 303/9.71; 303/113.5; 303/119.1
[58] Field of Search .......... 303/119 R, 113 AP, 9.71, 303/9.75, 111, 84.1, DIG. 1-3, 113 R

[56] References Cited

U.S. PATENT DOCUMENTS

| 4,632,467 | 12/1986 | Kircher et al. .......... 303/113 AP X |
| 4,676,558 | 6/1987 | Klein ................................. 303/114 |
| 4,898,430 | 2/1990 | Becker-Endrigkeit et al. .... 303/113 AP X |

FOREIGN PATENT DOCUMENTS

| 3136616 | 3/1983 | Fed. Rep. of Germany ...... 303/113 AP |
| 3440541 | 5/1986 | Fed. Rep. of Germany . |
| 1197013 | 7/1970 | United Kingdom . |
| 2137709 | 10/1984 | United Kingdom . |
| 2185299 | 7/1987 | United Kingdom . |

Primary Examiner—Robert J. Oberleitner
Assistant Examiner—Lee W. Young
Attorney, Agent, or Firm—Robert P. Seitter; Gordon J. Lewis

[57] ABSTRACT

In a hydraulic brake system for automotive vehicles with an electronically controlled brake force distribution and with anti-lock control, the rear-wheel brakes are connected via inlet valves (5, 7) closed in their inactive position. Placed in parallel to these valves is an arrangement (13, 14; 13', 14') which is substantially composed of the series connection of a brake force regulator (17, 18, 17', 18') with a throttle (15, 16) or a multiple-way valve (21, 22) which is open in its inactive position.

3 Claims, 2 Drawing Sheets

BRAKE SYSTEM FOR AUTOMOTIVE VEHICLES WITH ELECTRONICALLY CONTROLLED BRAKE FORCE DISTRIBUTION AND WITH ANTI-LOCK CONTROL

INTRODUCTION

The present invention relates to a hydraulic brake system for automotive vehicles with an electronically controlled brake force distribution and with anti-lock control, wherein the wheel brakes of the rear wheels are connected to a braking pressure generator via a common inlet valve or via an individual inlet valve which is closed in its inactive position and is switched open, and they are connected to a pressure compensating reservoir via outlet valves which are also closed in their inactive position and are switched open, comprising an auxiliary-pressure supply system, sensors for measuring the wheel rotational behavior as well as comprising an electronic circuit for processing the sensor signals and for generating braking pressure control signals.

BACKGROUND OF THE INVENTION

A brake system of this type is known from German published patent application 33 23 402. The braking pressure is varied in dependence on the wheel rotational behavior by means of electromagnetically operable valves, namely so-called inlet valves and outlet valves, in order to prevent locking of the wheels in the event of excessive brake actuation, on the one hand, and in order to conform the brake force distribution onto the front wheels and rear wheels to the respective braking situation, on the other hand. As is known, the effects of different load conditions of the vehicle, of the static and the dynamic axle load shifts 5 can be compensated for more or less precisely by means of control of the brake force distribution. To preserve the driving stability, it must always be ensured that the rear wheels will by no means lock prior to locking of the front wheels.

To control the brake force distribution, multiple-way valves closed in their inactive position are inserted as inlet valves into the brake lines leading to the rear wheels according to the German published patent application mentioned hereinabove. In contrast thereto, the inlet valves leading to the front wheels are open for the passage of pressure fluid in their inactive position. It is accomplished by clockwise actuation of the valves that an amount of brake slip is obtained at the rear wheels which is always less than that at the front wheels and which, preferably, amounts to roughly 85 to 97% of the front-wheel brake slip. This way, a major contribution of the rear wheels to braking is achieved, while simultaneously overbraking of the rear wheels is prevented.

According to this publication, the inlet valves and the outlet valves, the wheel sensors, the analyzing electronics and the auxiliary-pressure supply system are used for the control of the brake force distribution as well as for anti-lock control.

Further, a brake system is known already from German published patent application 34 40 541 which is equipped exclusively with wheel valves for the electronic control of brake force distribution. Hence wheel valves, namely solenoid valves closed in their inactive position, are inserted only into the brake lines leading to the rear-wheel brakes. Connected in parallel to these wheel valves is a brake force regulator through which braking pressure is supplied to the rear-wheel brakes on brake actuation, which pressure is conformed to the minimum pressure in dependence on the respective braking operation in the event of ideal brake force distribution. This braking pressure is raised to the higher value which optimally conforms to the instantaneous situation by actuation of the wheel valves. This arrangement is based on the consideration that even in the event of current failure or a valve defect, a minimum amount of braking pressure is supplied via the brake force regulator to the rear-wheel brakes so that even on such malfunction the rear axle is able to contribute to braking of the vehicle. Naturally this contribution is in many cases far less than the optimal, theoretically possible value. In other situations, the pressure transmitted via this parallel branch will result in wheel lock.

SUMMARY

It is an object of the present invention to improve the brake force exploitation of the rear wheels in a brake system with electronically controlled brake force distribution and with anti-lock control, so as to augment the contribution of the rear wheels to braking and, simultaneously, to ensure operation despite failures in the system. In the event of failure of the power supply or of similar defects the rear wheels are intended to still make a considerable contribution to braking. Locking of the rear wheels prior to locking of the front wheels is to be precluded.

This object is achieved by a brake system in which an arrangement is connected in parallel to the inlet conduit in which the inlet valve is disposed, which arrangement substantially is composed of the tandem connection of a brake force regulator and a throttle. Instead of the throttle, or in addition to the throttle in a series connection, a multiple-way valve can also be provided which is open in its inactive position and is switchable closed.

Advantageously, a pressure-limiting valve or a pressure-reducing valve is used as a brake force regulator.

In case of need, a non-return valve opening towards the wheel brake can be inserted downstream of the brake force regulator.

Hence, according to this invention, the effectiveness of an electronically controlled brake force regulator and, simultaneously, the reliability of the brake system on occurrence of specific defects or on failure of the control are improved to major extent in a simple way and by simple means. This is because actuation of the inlet valve that is closed in its inactive position allows raising of the braking pressure on the rear wheels—without jeopardizing the driving stability—to a comparatively high value at which the available friction value tires/road surface is exploited optimally. If so required, e.g. in the event of an abrupt change in the friction value, the pressure can be decreased very quickly again through the outlet valve. On the other hand, the introduction of pressure into the rear-wheel brake is ensured on failure of the power supply or disconnection of the control through the parallel path via the restrictor or the valve which is open in its inactive position, while the brake force regulator takes care of the limitation of the braking pressure in the rear-wheel brakes which is imperative for safety reasons.

Further features, advantages and possibilities of application of the present invention can be taken from the following description of embodiments of this invention with reference to the accompanying drawings.

DETAILED DESCRIPTION OF THE PREFERRED EMBODIMENTS OF THE INVENTION

Figure 1:
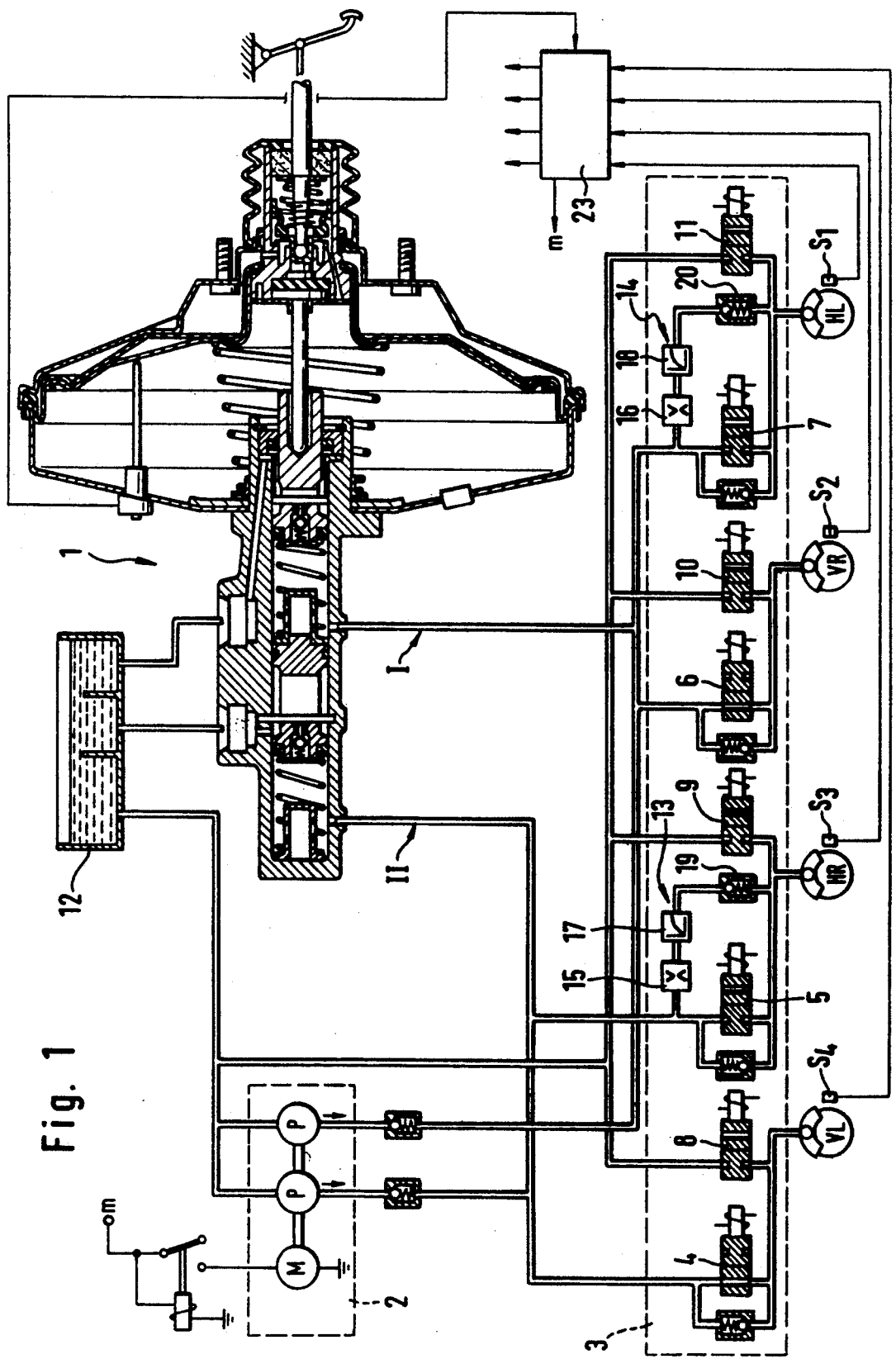
FIG. 1 is a schematic diagram of the major components of a brake system according to this invention.

A brake system according to FIG. 1 of this invention is substantially composed of a dual-circuit braking pressure generator 1, an auxiliary-pressure supply system 2 and a valve assembly 3 which comprises electromagnetically actuatable wheel valves, namely inlet valves 4 to 7 and outlet valves 8 to 11. Via these inlet valves and outlet valves, the wheel brakes are connected in a diagonal brake-circuit allotment to two brake circuits I, II of the braking pressure generator 1 and, respectively, to a pressure compensating reservoir 12. The front wheels VL, VR are connected in a conventional manner via multiple-way valves 4, 6 which assume their open position when inactive as well as via multiple-way valves 8, 10 closed in their inactive position. In contrast thereto, the brakes of the rear wheels HR, HL communicate with the brake circuits I, II and, respectively, with the braking pressure generator 1 via multiple-way main inlet valves 5, 7 closed in their inactive position. The associated outlet valves 9, 11 are closed in their inactive position. Allocated to the wheels according to FIG. 1 are wheel sensors S1 to S4, the outlet signals of which are edited and processed in an electronic controller 23.

The essence of this invention resides in the inlet conduits and/or arrangements 13, 14 connected in parallel to the main inlet valves 5, 7 of the rear-wheel brakes. In the embodiment according to FIG. 1, these arrangements consist of the tandem connection of a throttle or fixed flow restriction 15, 16 and a brake force regulator 17, 18 and, if necessary, a non-return valve 19, 20 which opens towards the wheel brake of the corresponding rear wheel HR, HL.

Figure 2:
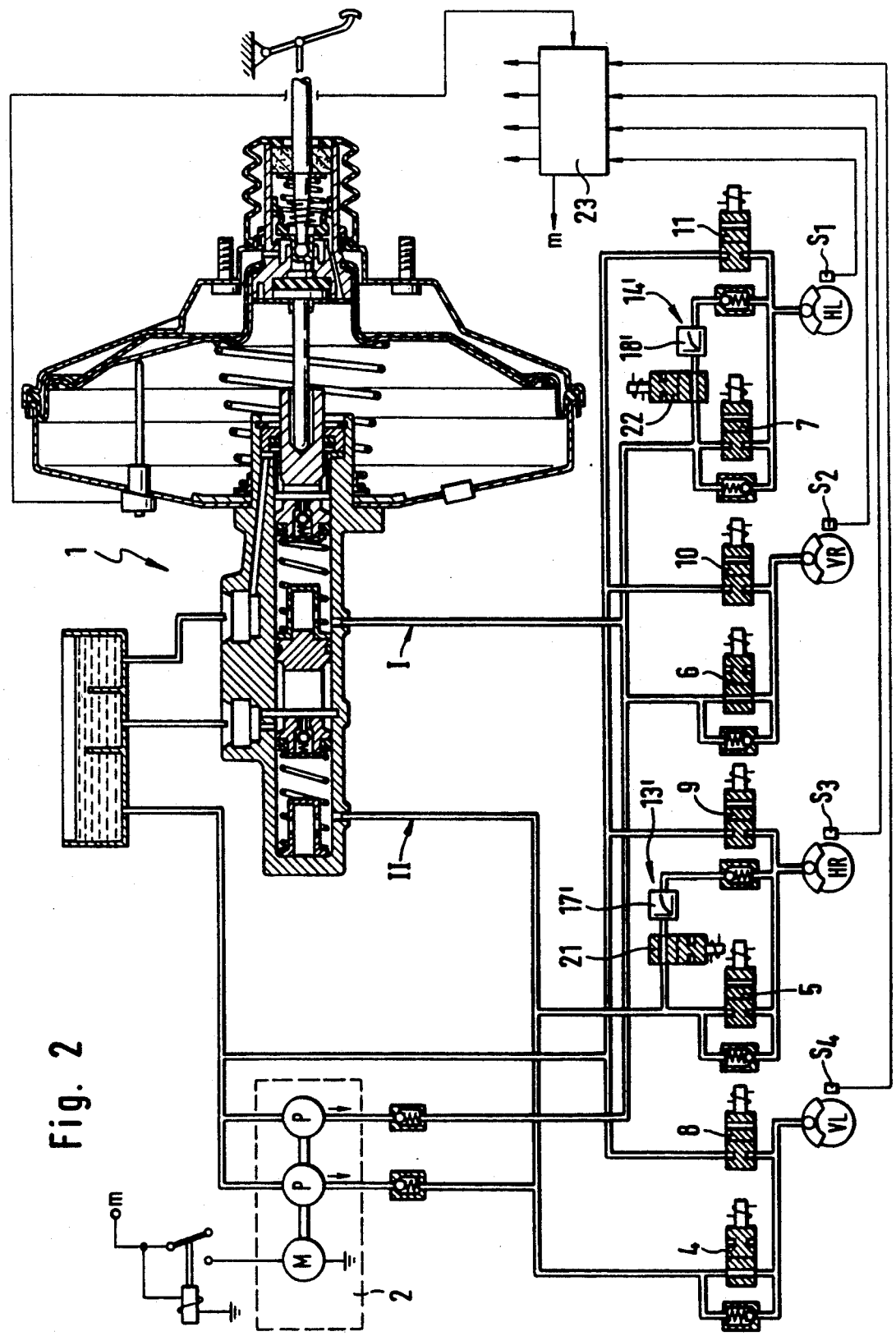
FIG. 2 is a schematic diagram of the major components of a brake system according to a second embodiment of this invention.

The embodiment according to FIG. 2 differs—apart from the corresponding modification of the electronics—from the embodiment according to FIG. 1 only by the use of electromagnetically actuatable supplemental inlet solenoid valves 21, 22 in the inventively essential inlet conduits 13', 14' instead of the throttles 15, 16 according to FIG. 1. These valves 21, 22 are two-way/two-position directional control valves which are open in their inactive position.

When the system is intact, at first both solenoid valves 5, 21; 7, 22 disposed in the connecting conduit from the braking pressure generator 1 to the wheel brakes of the rear wheels HL, HR are switched over on every braking operation for the purpose of control of the brake force distribution. The distribution of the braking pressure onto the front wheels and rear wheels will then be controlled in dependence on the rotational behavior of the wheels by way of temporarily switching the main inlet valves 5, 7, back to their former closed position. The parallel inlet conduits 13', 14' are closed and therefore do not influence the braking pressure distribution. In case of need, e.g. in the presence of an abrupt change of the friction value to a very low coefficient of friction, the pressure in the wheel brakes of the rear wheels can be decreased via the outlet valves 9, 11.

Once the control is de-activated or the power supply is disconnected, pressure fluid propagates to the brakes of the rear wheels HR, HL via the valves 21, 22 switched to open passage and via the brake force regulators 17', 18'. In contrast to the embodiment according to FIG. 1, no throttle retards the pressure fluid flow to the rear-wheel brakes.

Hence follows that according to the two embodiments of this invention previously described by way of FIG. 1 and FIG. 2, for the purpose of electronic control of the brake force distribution there is need for only few component parts in addition to the structural parts which are required anyway for anti-lock control. Since the safety requirements made on the brake force distribution can be fulfilled by means of the inlet conduits 13, 13', 14, 14', there is greater freedom in dimensioning the rear-wheel brakes. Larger wheel cylinder diameters can be used as well. This is feasible because the maximum possible braking pressure can be introduced and preserved owing to the constant slip measurement. In the event that excessive pressure prevails and/or braking pressure reduction becomes necessary at the rear axle, the braking pressure can be decreased by means of the corresponding anti-lock outlet valves 9, 11, as has been explained already.

On brake application, first the main inlet valves 5, 7 which lead to the rear-wheel brakes are switched over in the embodiment according to FIG. 1. Pressure is built up in the wheel brakes of the rear wheels practically independently of the pressure fluid flow through the parallel inlet conduit 13, 14. When specific slip values at the rear wheels are exceeded, the corresponding inlet valve 5, 7 is switched back to assume its inactive position, i.e. it will be closed. Since further pressure increase in the rear-wheel brakes is possible via the parallel conduit 13, 14, the pressure level must be reduced under certain circumstances by driving and opening the outlet valves 9, 11. It is necessary in this case to switch on the pump of the auxiliary-pressure supply system 2.

The anti-lock control is performed in a known manner by way of driving the inlet valves and outlet valves with the aid of the auxiliary-pressure source.

As described hereinabove, solenoid operated supplemental inlet valves which are open in their inactive position are used instead of throttles in the embodiment according to FIG. 2. It is accomplished thereby that the parallel pressure fluid conduit 13', 14', too, can be closed when the inlet valve 5, 7 is closed, whereby further pressure increase in the wheel brakes of the rear wheels is prevented. In general, this obviates the need for switching on the auxiliary-pressure supply system within the bounds of the control of brake force distribution.

What is claimed is:

1. A hydraulic antilock brake system for the front and rear wheels of an automotive vehicle with a front and rear brake distribution control comprising:
   a foot operated braking pressure generator;
   an auxiliary pressure supply;
   a pressure compensation reservoir;
   at least one front wheel brake in fluid communication with said pressure generator and auxiliary pressure supply through a normally open electromagnetically actuatable inlet valve and with said reservoir through an electromagnetically operable normally closed outlet valve;
   at least one rear wheel brake in fluid communication with said pressure generator and said auxiliary pressure supply through a normally closed electromagnetically actuatable main inlet valve, and in fluid communication with said reservoir through a normally-closed electromagnetically actuatable outlet valve;

front and rear wheel sensor generating signals corresponding to said front and rear wheel rotational behavior;

a control circuit operative to generate inlet and outlet valve actuation signals in response to said sensor signals to operate said front and rear inlet and outlet valves so as to eliminate slip conditions;

a supplemental normally open electromagnetically actuatable inlet valve connecting said pressure generator and auxiliary pressure supply in parallel to said main inlet valve;

a brake force regulator connected in series with said supplemental inlet valve operative to regulate rear wheel brake pressure relative to front wheel brake pressure with said supplemental inlet valve open;

said control circuit operative to close said supplemental inlet valve and open said main inlet valve upon initiation of brake actuation.

2. The hydraulic brake system of claim 1, wherein said front wheel brake is interconnected with said generator through a normally-open electromagnetically actuatable inlet valve, and interconnected with said reservoir through a normally-closed electromagnetically actuatable outlet valve.

3. The hydraulic brake system of claim 1, wherein said control circuit is operative to ensure that a rate of slip of a wheel associated with said rear wheel brake does not exceed a rate of slip of said front wheel brake.

* * * * *